United States Patent [19]

Mawby et al.

[11] Patent Number: 4,632,280

[45] Date of Patent: Dec. 30, 1986

[54] ICE DISPENSING MECHANISM

[75] Inventors: Harold S. Mawby, Belding; Duane H. Harris, Gowen; Myrne E. Fryover, Lakeview, all of Mich.

[73] Assignee: White Consolidated Industries, Inc., Cleveland, Ohio

[21] Appl. No.: 654,233

[22] Filed: Sep. 25, 1984

[51] Int. Cl.$^4$ ............... G01F 11/00; G01F 11/14
[52] U.S. Cl. ............... 222/275; 222/243; 222/333; 222/409; 74/110
[58] Field of Search ......... 222/231, 243, 244, 246, 222/252, 265, 266, 199, 275, 277, 333, 409, 276; 198/775; 62/344; 74/110

[56] References Cited

U.S. PATENT DOCUMENTS

| | | | |
|---|---|---|---|
| 2,432,852 | 12/1947 | Arvidson | 222/409 X |
| 3,708,053 | 1/1973 | Anderson | 198/775 X |
| 3,887,119 | 6/1975 | Sucro et al. | 222/247 |
| 3,892,337 | 7/1975 | Neumann | 62/344 X |
| 3,930,380 | 1/1976 | Fogt | 64/15 C |
| 3,968,906 | 7/1976 | Kochendorfer et al. | 222/243 |
| 4,220,266 | 9/1980 | Braden et al. | 222/477 |

*Primary Examiner*—Charles A. Marmor
*Assistant Examiner*—Gregory L. Huson

*Attorney, Agent, or Firm*—Pearne, Gordon, Sessions, McCoy, Granger & Tilberry

[57] ABSTRACT

An ice cube storage bin located beneath an automatic ice maker of a domestic refrigerator contains a pair of elongated ice dispensing rams that reciprocate along parallel lines, one of the rams moving toward the front of the bin, as the other moves toward the rear. The rams are interconnected by a pulley mounted belt that pulls one ram to the rear of the bin, as the other ram is pushed toward the front of the bin by a drive mechanism. The drive mechanism includes a pair of cam discs eccentrically mounted in opposed relation on a common motor shaft located outside of the bin adjacent its rear wall. A pair of resilient lever arms, having their top ends pivotally mounted to the outside of the rear wall of the bin and their bottom ends pivotally connected to the rearward ends of the rams which extend from the interior of the bin, are engaged at their intermediate portions by the rotating cam discs wherein the rams are alternately pushed by the bottom ends of the lever arms toward the front of the bin. The use of dual reciprocating rams, and the simplified push-pull drive means including the pulley mounted belt and the eccentric cam discs, provide a highly efficent and reliable ice dispensing mechanism.

11 Claims, 9 Drawing Figures

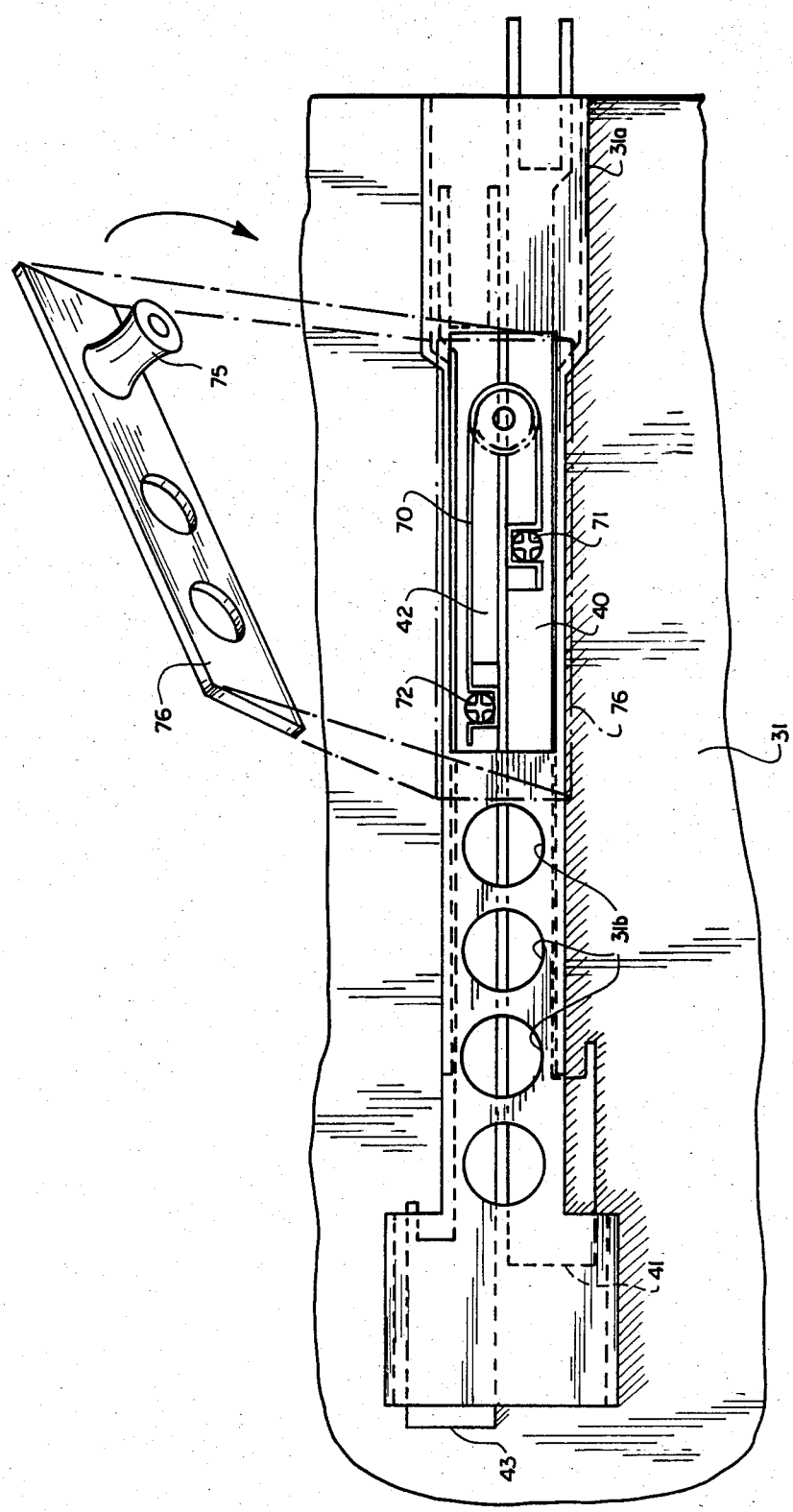

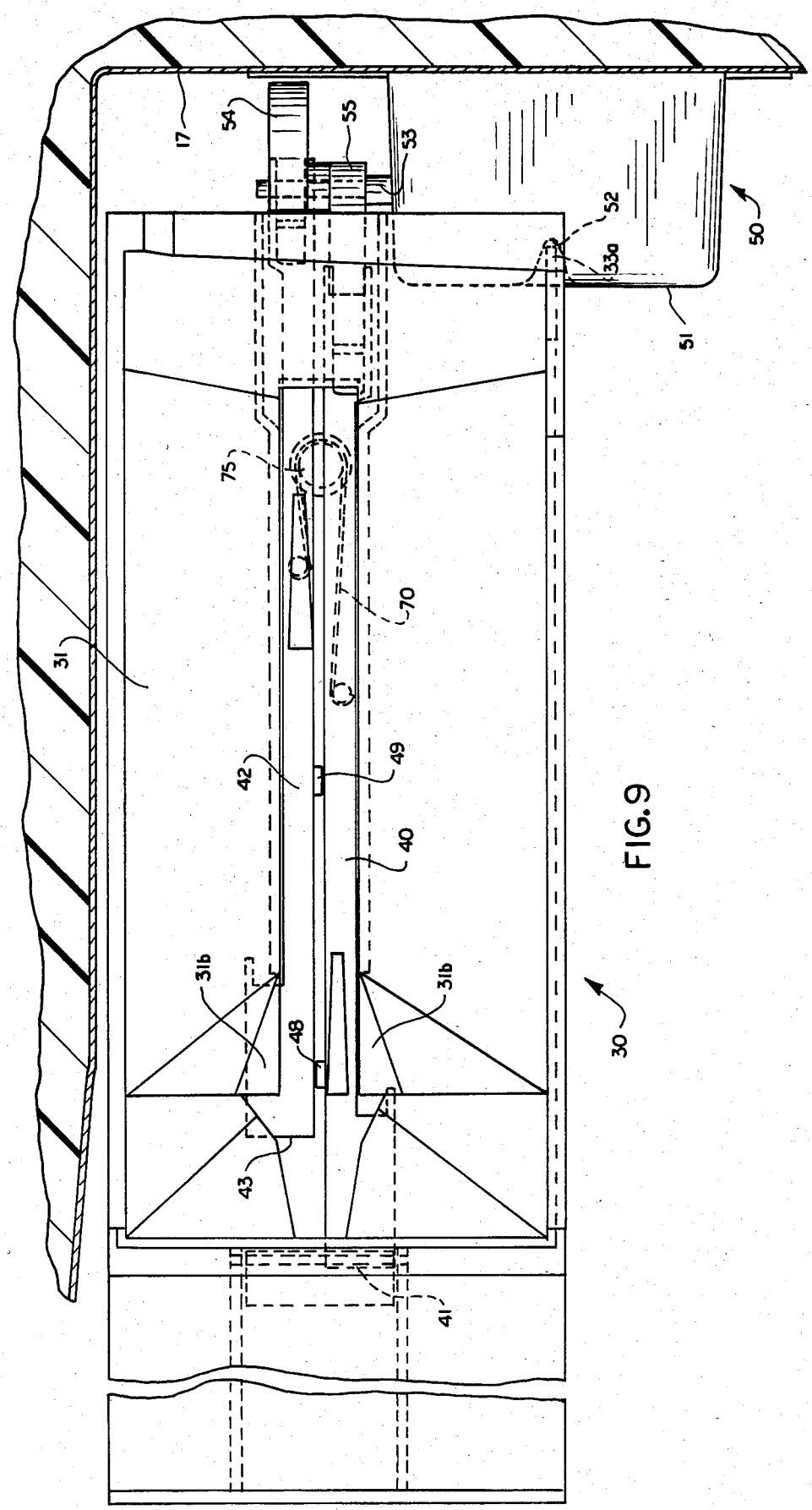

ICE DISPENSING MECHANISM

BACKGROUND OF THE INVENTION

The present invention relates in general to ice dispensers, and in particular to an automatic ice cube dispenser located in the freezer compartment of a domestic refrigerator.

Ice dispensers, for use in domestic refrigerators having a freezer door mounted ice chute for conveying ice cubes through the closed freezer door, are well known in the art. Examples of such automatic ice dispensers are illustrated by U.S. Pat. Nos. 3,887,119 and 3,968,906, both owned by the assignee of the present invention. The prior art dispensers illustrated in the noted patents each include a single oscillating and reciprocating ice ram that is driven by a relatively complex drive mechanism illustrated most clearly in U.S. Pat. No. 3,930,380, also owned by the assignee of the present invention.

While the noted prior art ice dispensers have operated satisfactorally, they are, under certain conditions, prone to jamming. Such jamming can occur, for example, when ice cubes stored in the dispenser are inadequately agitated by the single ice ram wherein the ice cubes, over a period of time, freeze together to form lumps that jam the dispensing and agitating movement of the ice ram. Further, the drive mechanism illustrated in noted U.S. Pat. No. 3,930,380 is relatively complex and therefore expensive to manufacture.

It is a goal of the present invention to provide an ice dispenser mechanism that is less prone to jamming than prior art devices, the improved ice dispenser having a low cost, reliable drive mechanism that is relatively simple in its operation.

SUMMARY OF THE INVENTION

In accordance with the present invention, an automatic ice dispensing mechanism includes a bin for storing the ice pieces, e.g. cubes, the bin having a floor, a front wall, a rear wall, and a pair of opposed sidewalls. The bin includes at its front end an aperture or opening through which the ice pieces are pushed and expelled from the interior of the bin.

A pair of elongated, side-by-side, ice rams are mounted in the bin, the ice rams being adapted to push the ice pieces through the aperture at the front end of the bin. Both of the ice rams are movable and reciprocate along parallel lines, one of the ice rams moving linearly toward the front of the bin, as the other ram moves linearly toward the rear thereof.

Drive means for moving the ice rams relative to the bin and each other is provided in the form of a drive mechanism for alternately pushing the rams toward the front end of the bin, and a return mechanism for alternately pulling the rams toward the rear end of the bin. The drive mechanism preferably includes a pair of side-by-side cam discs eccentrically mounted in opposed relation on a common motor driven shaft extending perpendicular to the parallel lines along which the ice rams reciprocate. A pair of generally vertically extending, side-by-side, lever arms have their upper ends pivotally mounted to the upper outside face of the rear wall of the bin. The lower ends of the lever arms are pivotally mounted to the rearward ends of the rams which extend out of the interior of the bin. The intermediate portions of the lever arms are engaged by the rotating cam discs, the cam discs applying a force against one and then the other of the lever arms, which in turn alternately drive their associated ice rams toward the front of the bin.

The return mechanism includes means interconnecting the rams wherein a force applied to one ram to move it toward the front of the bin is also applied, via the interconnecting means, to the other ram to simultaneously move it toward the rear of the bin. Preferably, the interconnecting means is constituted by a pulley, and a belt having one end connected to one of the rams, the other end of the belt being connected to the other of the rams. The mid portion of the belt is looped over the pulley so that the belt pulls on one ram as the ram to which the other end of the belt is connected is pushed by the drive mechanism toward the front of the bin.

The ice dispensing mechanism in accordance with the invention has been found to be low in manufacturing cost, and highly reliable in operation, wherein jamming of the dispensing mechanism by agglomerated ice cubes has been eliminated.

BRIEF DESCRIPTION OF THE DRAWINGS

A fuller understanding of the invention may be had by referring to the following description and claims taken in conjunction with the accompanying drawings, wherein:

FIG. 7 is a bottom plan, partially exploded view of the central area of the ice bin portion illustrated in FIGS. 5 and 6;

FIG. 9 is a top plan view of the ice dispenser mechanism illustrated in FIG. 8.

DETAILED DESCRIPTION OF THE PREFERRED EMBODIMENT

Figure 2:
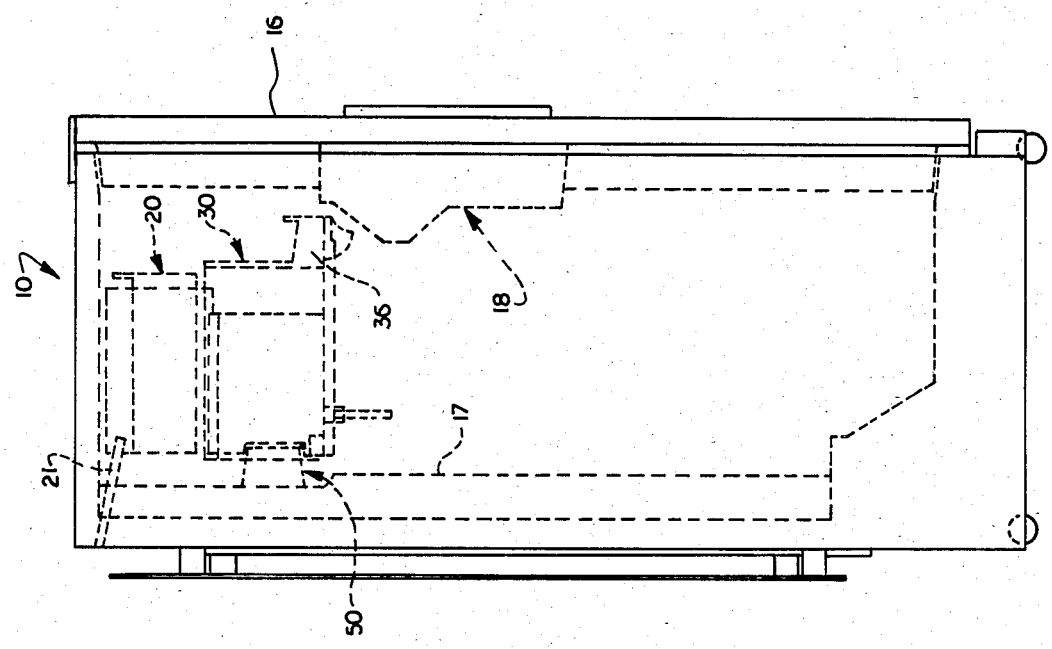
FIG. 2 is a side elevation view of the refrigerator illustrated in FIG. 1.
Figure 1:
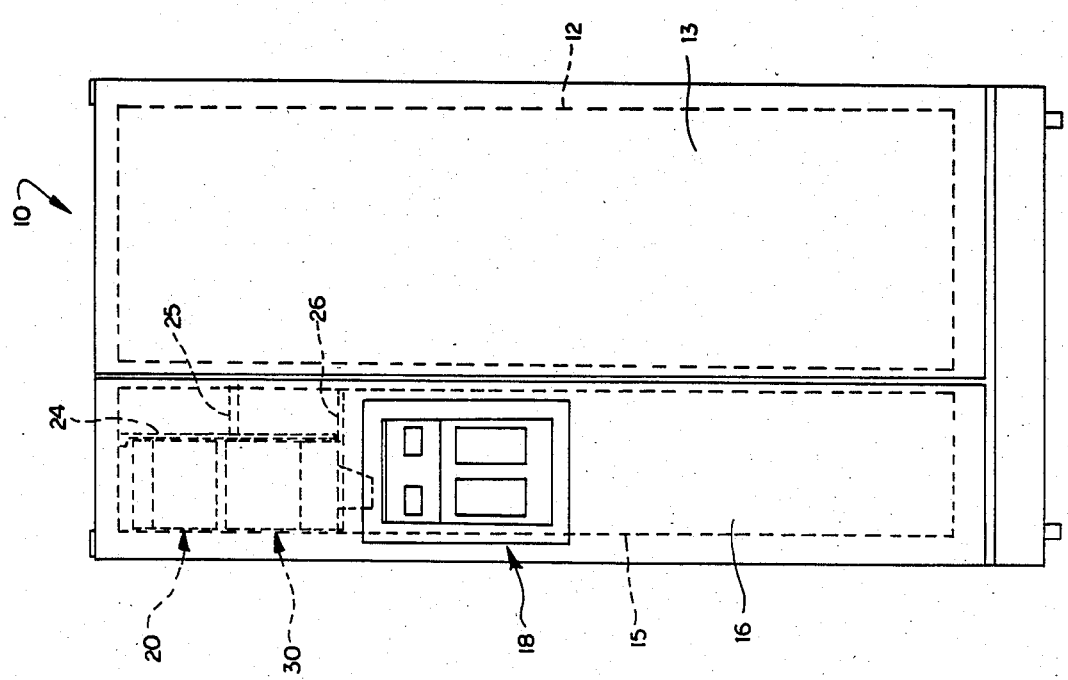
FIG. 1 is a front elevation view of a domestic refrigerator incorporating an ice dispenser mechanism in accordance with the present invention.

With reference to FIGS. 1 and 2, there is illustrated a domestic refrigerator 10 commonly referred to as a side-by-side refrigerator/freezer. The refrigerator 10 provides a refrigerator compartment 12 accessible by opening of a hinge mounted refrigerator door 13 and a smaller freezer compartment 15 accessible by means of a hinge mounted freezer door 16. Located at the midportion of the freezer door 16, and supported by it, is an ice chute and chilled water dispenser apparatus 18 of a conventional type. As is well known in the art, the user can obtain chilled water or ice pieces, e.g. cubes, without opening the freezer door 16 by use of the dispenser apparatus 18, such apparatus being illustrated for example in U.S. Pat. No. 4,220,266 owned by the assignee of the present invention.

Located in the upper portion of the freezer compartment 15, at a position above the ice chute and chilled water dispenser apparatus 18, are an automatic ice maker 20 and, underlying it, an ice bin 30 constituting a portion of an ice dispensing mechanism in accordance with the present invention. The ice bin 30 stores ice pieces, e.g. ice cubes, automatically provided by the ice maker 20. Upon demand, the bin 30 dispenses the stored ice cubes to the user via the ice chute and chilled water dispenser apparatus 18. Moving elements within the ice bin 30 are driven by a drive means 50, mounted on the back wall 17 of the freezer compartment 16, the drive means 50 to be subsequently illustrated in greater detail. The ice bin 30 can be manually removed by the user from the freezer compartment 15, the ice bin 30 resting upon an ice bin supporting shelf 26. Extending upwardly from the ice bin supporting shelf 26 is a divider wall 24 which divides the upper portion of the freezer compartment 15 into a left half containing the ice maker 20 and bin 30, and a smaller right half which is subdivided into top and bottom sections by a freezer compartment shelf 25.

Figure 3:
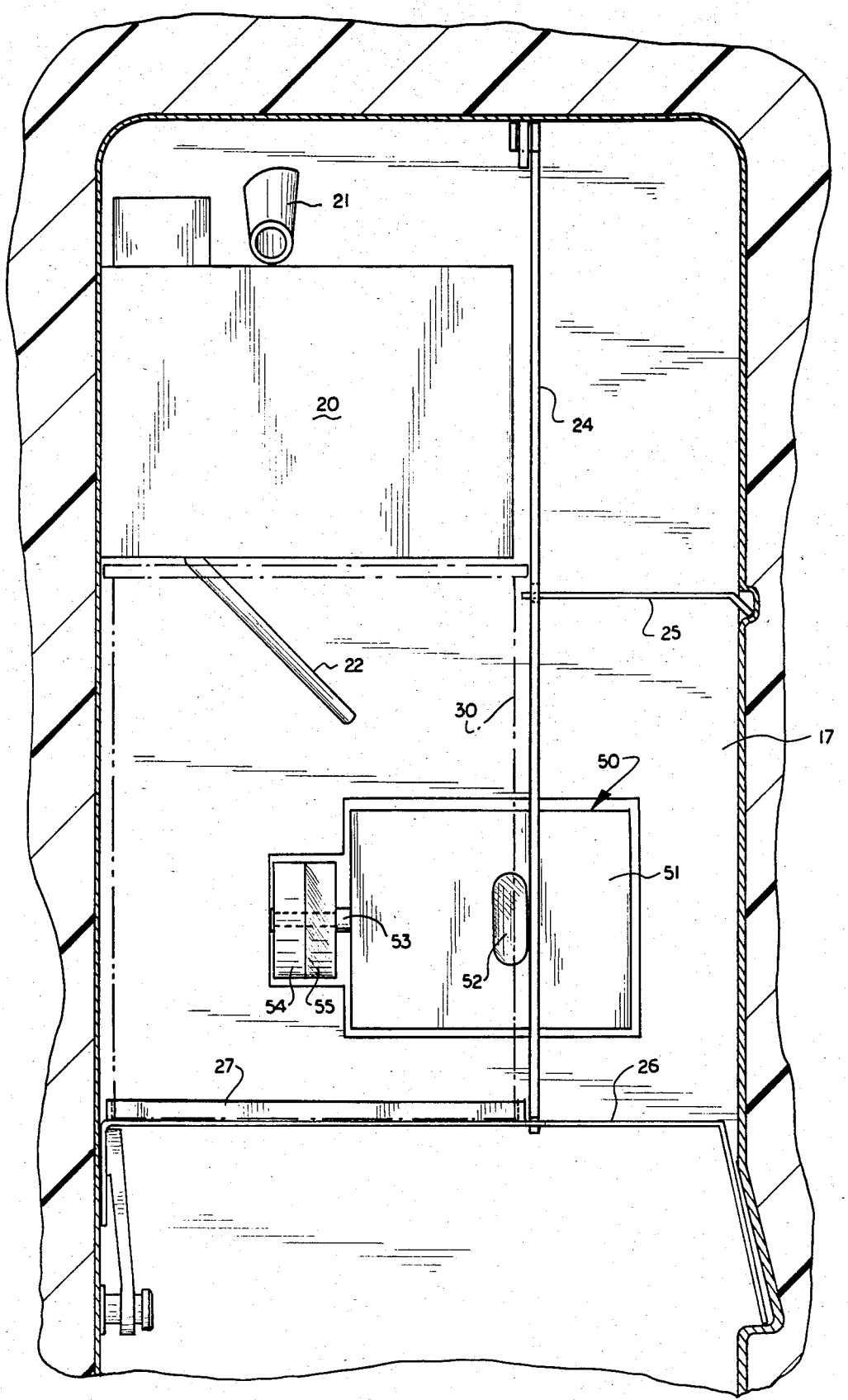
FIG. 3 is a sectional view of the upper portion of the freezer compartment of the refrigerator of FIGS. 1 and 2 wherein the ice dispenser mechanism is located.

With reference to FIG. 3, the positioning of the automatic ice maker 20 and the bin 30 (shown in phantom) relative to the divider wall 24, the compartment shelf 25, and the supporting shelf 26, is more clearly illustrated. The drive means 50 for the ice dispensing bin 30 is shown to include a housing 51 containing a conventional motor therein, the housing 51 being secured by suitable means to the back wall 17 of the freezer compartment 16 (also see FIG. 2). The housing 51 includes on its front face a housing recess 52 which receives a projecting tongue portion at the rear of the bin 30, the torque portion to be subsequently illustrated. As viewed in FIG. 3, extending from the left end of the housing 51, is a rotatable drive motor shaft 53 upon which are fixed a pair of cam discs 54 and 55 which rotate with the shaft 53 upon energization of the motor contained within the housing 51. As is well known in the art, the ice maker 20 receives, at appropriate intervals, water from a fill tube 21 (also see FIG. 2) and freezes such water into ice pieces such as ice cubes which are then automatically dropped into the bin 30. A movable bail 22 extends downwardly from the ice maker 20 into the interior of the bin 30 to sense the level of ice in the bin 30 so as to control the operation of the ice maker 20.

Figure 4:
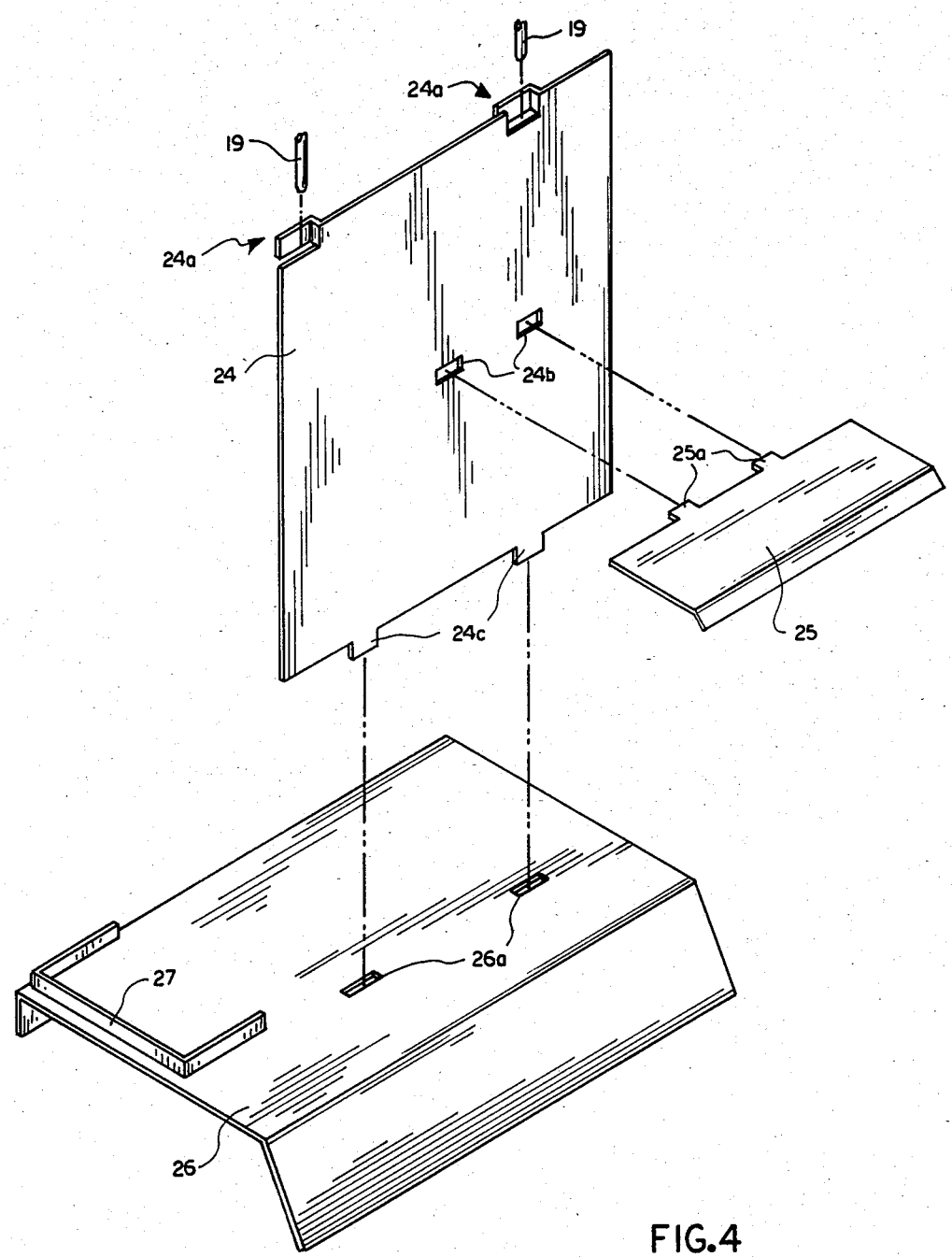
FIG. 4 is an exploded view of freezer compartment members illustrated in FIG. 3.

With reference to FIG. 4, the divider wall 24, the freezer compartment shelf 25, and the ice bin supporting shelf 26 are more clearly illustrated. The divider wall 24 can be seen to include along its upper edge a pair of hooklike elements 24a that receive a pair of corresponding pins 19 that extend downwardly from the ceiling of the freezer compartment. The divider wall 24 further includes a pair of slots 24b located in its intermediate portion, and a pair of tabs 24c extending downwardly from its lower edge. The freezer compartment shelf 25 includes along its inner (leftward) edge a pair of tabs 25a received by the slots 24b of the divider wall 24. In a similar fashion, the ice bin supporting shelf 26 has a pair of slots 26a which receive the tabs 24c of the divider wall 24. The outer left and right edges of the ice bin supporting shelf 26 and, the outer (rightward) edge of the freezer compartment shelf 25 are supported by the freezer compartment walls as illustrated most clearly in FIG. 3. Also, the ice bin supporting shelf 26 includes along its forward edge an ice bin retaining lip 27 that aids in retaining the bin 30 in position within the freezer compartment (also see FIG. 3). The retaining lip 27 precludes the bin 30 from sliding around on and off of the shelf 26, the user, in order to remove bin 30 from the freezer compartment, having to raise the front portion of the bin 30 so as to clear retaining lip 27. The user can then pull the ice bin 30 out of the freezer compartment for maintenance purposes, such as the cleaning thereof.

Figure 6:
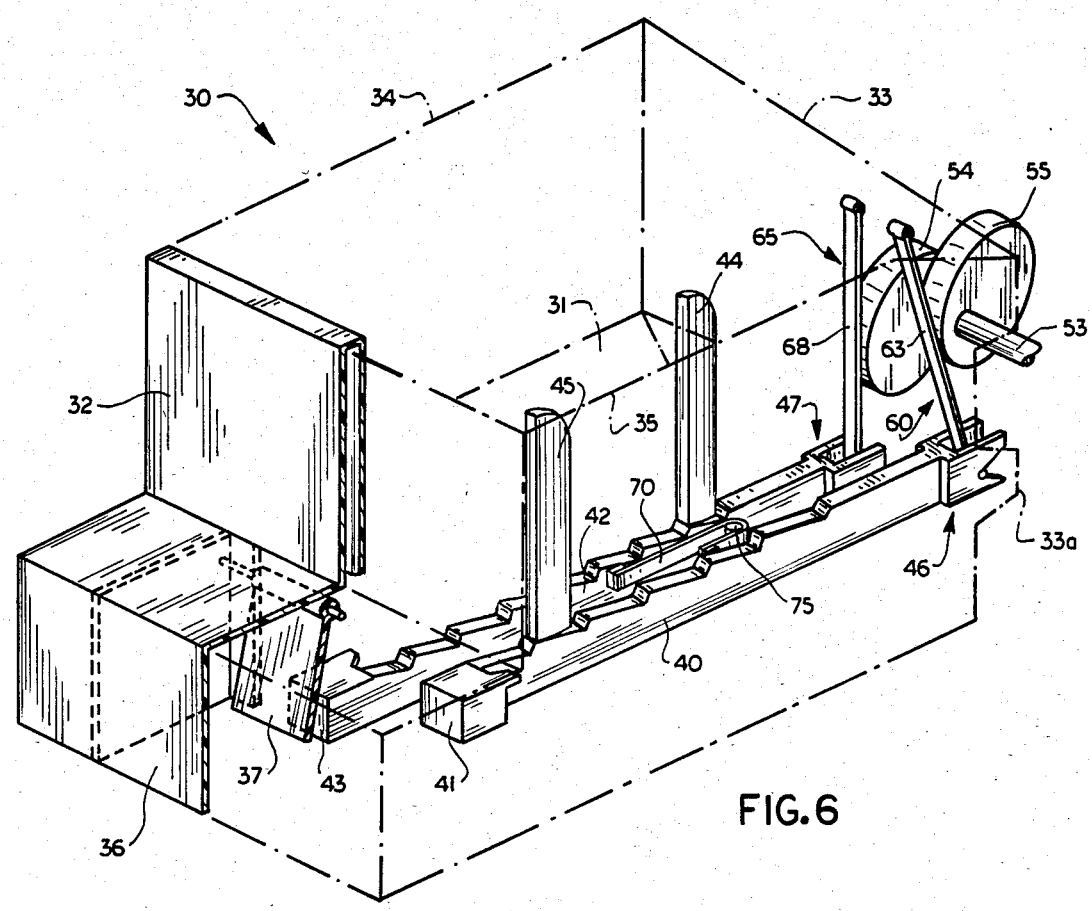
FIG. 6 is a different perspective view of the ice bin portion illustrated in FIG. 5, with portions cut away.
Figure 5:
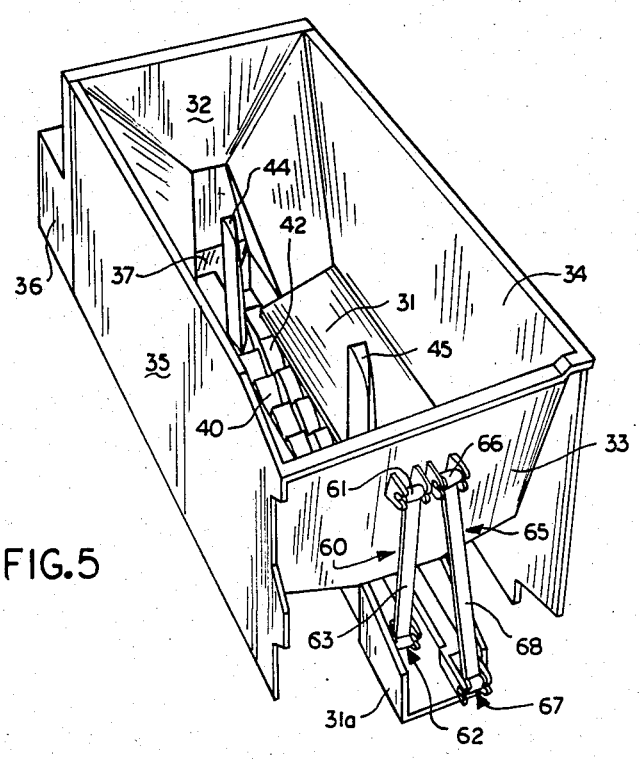
FIG. 5 is a perspective view of an ice bin portion of the ice dispenser mechanism in accordance with the present invention.

With reference to FIGS. 5 and 6, there is shown in greater detail the structure of the ice bin 30 in accordance with the present invention. A bin 30 can be seen to include a floor 31, a front wall 32, a rear wall 33 and a pair of opposed sidewalls 34, 35. The central portion of the floor 31 is recessed to provide an elongated trough extending the length of the bin 30, the trough slidingly receiving a first elongated ice ram 40 and a second elongated ice ram 42, the ice rams being positioned in side-by-side relationship for reciprocating movement back and forth along parallel lines. The first ice ram 40 includes a ram end 41 which engages ice cubes (not shown) as it moves towards the front wall 32 of the bin 30 to force such ice pieces out of an aperture at the front end of the bin 30, the aperture normally being closed by a spring loaded trap door 37 housed within a bin extension 36. In a similar fashion, the second elongated ice ram includes a ram end 43 that also functions to push and expel ice cubes from the interior of the bin 30 via the aperture normally closed by the spring loaded trap door 37.

It can be seen that a major portion of the upper surfaces of the rams 40, 42 are stepped so as to move ice in the bin 30 toward the front thereof as the rams reciprocate back and forth while oscillating relative to each other i.e. as one ram moves toward the front of the bin, the other ram withdraws to the rear.

The first elongated ice ram 40 can be seen to include an ice agitator fin 44 that extends upwardly therefrom while the second elongated ice ram 42 includes in similar fashion a second ice agitating fin 45 extending upwardly therefrom as illustrated. Fin 44 is located toward the front of its ram 40, while fin 45 is located toward the rear of its ram 42. Thus, reciprocating fin 44 serves to agitate ice cubes stored in the front of the bin while reciprocating fin 45 agitates ice cubes stored in the rear of the bin, such dual fin agitation assuring that the stored ice cubes do not stick together or agglomerate over a period of time.

With particular reference to FIG. 5, the bin 30 can be seen to include at its rearward end an extension 31a of the recessed trough portion of the floor 31, the extension 31a slidably supporting rearward yokelike drive ends 46, 47 (see FIG. 6) of the rams 40, 42 that extend out of the rear of the bin 30 as illustrated.

In accordance with the present invention, the ice dispenser mechanism includes a first lever arm 60 and a second lever arm 65. The first lever arm 60 has an upper end 61, a lower end 62 and an intermediate portion 63, while the second lever arm 65, in a similar fashion, has an upper end 66, a lower end 67 and an intermediate portion 68. The lever arms 60, 65 are parallel to each other and extend generally vertically from the top portion of the outer face or surface of the rear wall 33 to the extended ends of the rams 40, 42. The upper ends 61, 66 of the lever arms 60, 65 are pivotally connected by suitable pin joints to the rear wall 33 of the bin 30 as illustrated. In a similar fashion, the lower end 61, 67 of the lever arm 60, 65 are pivotally connected by suitable pin joints to the rearward yokelike drive ends 46, 47 (see FIG. 6) of the rams 40, 42 as illustrated.

With particular reference to FIG. 6, the cam discs 54, 55 mounted on shaft 53, as discussed earlier, can be seen to be eccentrically mounted on shaft 53 in opposed relation, that is, the cams 54, 55 are 180° out of phase relative to each other. Upon rotation of the shaft 53, cam 54 will engaged the intermediate lever arm portion 68, while cam disc 55 will engage the intermediate portion 63 of lever arm 60. As cam disc 54 pushes on lever arm 65, ram 42 will be pushed towards the front of the bin 30 to expel, via trap door 37, ice cubes engaged by the ram end 43 of ice ram 42. In a similar fashion, cam disc 55 pushes on lever arm 63, ram 40 then being pushed towards the front of the bin 30 to expel, via trap door 37, ice cubes engaged by the ram end 41 of ice ram 40. The pushing action of the discs 54, 55 and the rams 40, 42 via the lever arm 60, 65 alternates dues to the eccentrically opposed positions of the cam discs 54, 55 on the shaft 53.

An interconnecting means, constituted by a flexible belt 70 and a pulley 75 (see FIG. 6), functions as a return mechanism alternated to move the rams 40, 42 toward the rear of the bin after they have been alternately driven to their forward position by the cam discs 54, 55. One end of the belt 70 is connected to ram 40 while the other end is connected to ram 42, the intermediate portion of the flexible belt 70 being looped over the pulley 75 so that as the ram 42 moves toward the front of the bin, the belt will apply a pulling force on ram 40 to move it toward the rear thereof and vice versa, i.e. movement of ram 40 to the front of the bin 30 will apply, via belt 70, a pulling force to ram 42 to move it toward the rear of the bin.

Thus, it can be seen that the drive mechanism for alternately moving the rams 40, 42 in toward the front of the bin includes the pair of elongated lever arms 60, 65 having their upper ends fixed in relation and pivotally mounted to the top portion of the back wall of the bin, while the lower movable ends 62, 67 (see FIG. 5) of the lever arms 60, 65 are pivotally connected to the exposed rear ends 46, 47 (see FIG. 6) of the ice rams 40, 42. As the eccentrically mounted cam discs in opposed relation rotate with shaft 53, they alternately apply driving force to the lever arms wherein they in turn drive in alternating fashion the rams 40, 42. It can also be seen that the belt 70 and pulley 75 together constitute a return mechanism that interconnects the rams wherein the force applied to one ram to move it towards the front of the bin is also applied via the interconnecting means i.e. the pulley 75 and the belt 70, to the other ram to simultaneously move it or pull it toward the rear of the bin. Thus, the rams reciprocate along parallel lines back and forth in the bin 30 while oscillating relative to each other, such dual ram movement having been found to provide excellent agitation of ice cubes stored in the bin 30, and efficient dispensing of ice cubes from the bin 30 via the spring loaded trap door 37 housed in the bin extension 36.

It is to be noted that preferably the lever arms 60, 65 are formed of resilient material such as spring steel. Thus, the resilient lever arm 60, 65 will permit limited rotation of the cam discs 54, 55 without corresponding movement of the ice rams 40, 42 toward the front of the bin. This limited rotation causes an increasing force to be applied to the ice rams to dislodge any ice pieces blocking forward movement of the ice rams.

It can also be seen that the motor driven shaft 53 lies along the axis of rotation of the cam discs and that this axes of rotation is perpendicular to the parallel lines along which the reciprocating ice rams move. Thus, a very compact ice dispensing package is provided for.

With reference to FIG. 7, the bottom of the center or trough portion of the bin 30 is illustrated. The recessed trough portion of the floor 31 can be seen to include a plurality of apertures 31b through which water that sometimes forms in or inadvertently enters into the ice bin 30 can drain. Also, the apertures 31b permit small ice pieces to fall out of the bin 30 to preclude jamming of the rams 40, 42. It can be seen that one end of the belt 70 is fastened in fixed position to the ram 40 by a clamping screw 71 while the other end of the belt 70 is fastened in position to the other ram 42 by another clamping screw 72. The intermediate portion of the belt 70 is looped over the pulley 75 which is supported for rotary movement by a removably pulley support 76 fastened to the bin as illustrated to form a portion of the trough portion of the floor 31. The pulley 75, while rotatable, is fixed in position on support 76 so that the rams 40, 42 reciprocate relative to it, the axis of rotation of the pulley being positioned between the rams 40, 42 as illustrated.

Figure 8:
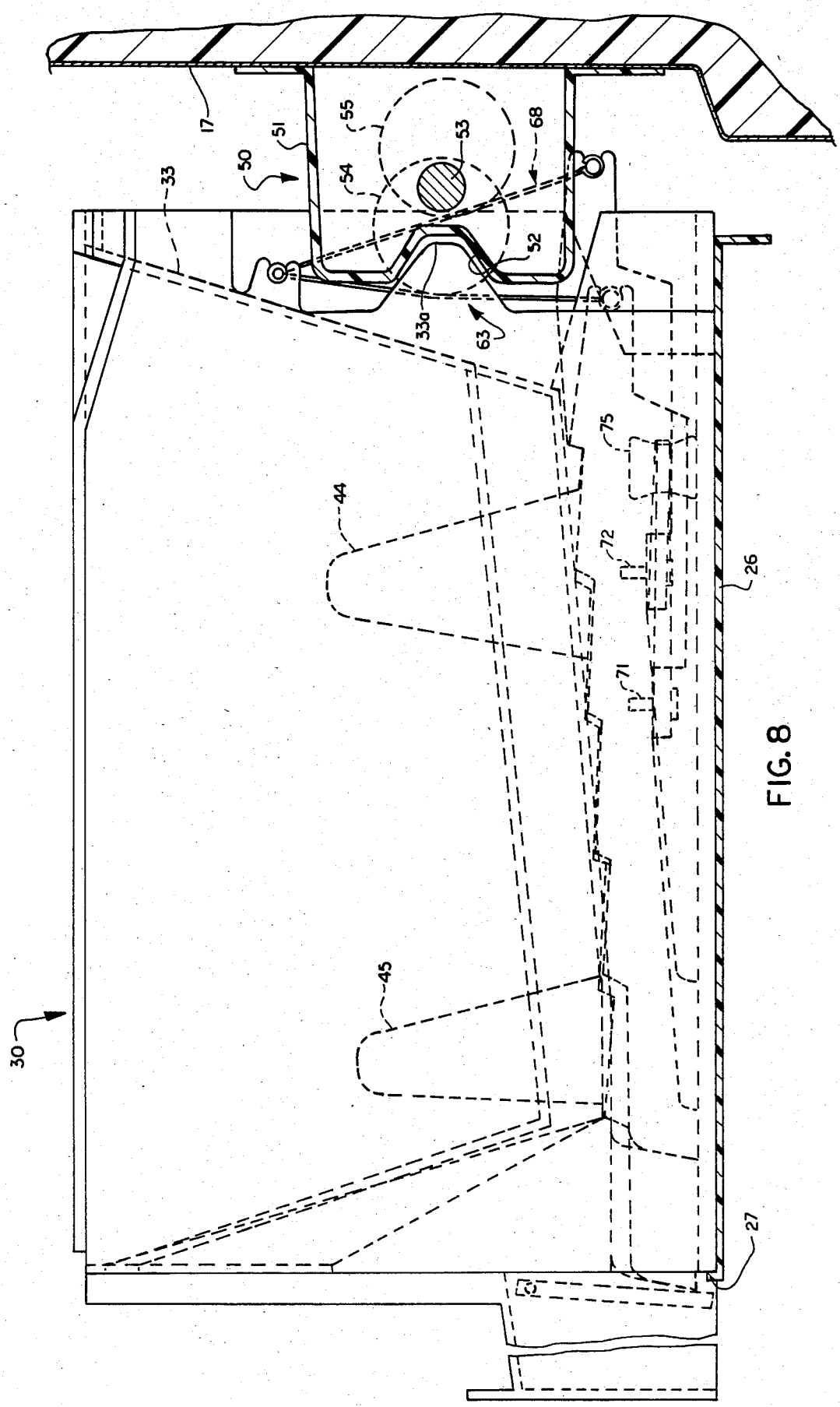
FIG. 8 is a side elevation view of the ice dispenser mechanism according to the invention including the drive mechanism associated with the ice bin portion of the dispenser.

The relative positions of the drive means 50 relative to the bin 30 can be seen with reference to FIG. 8. The bin 30 can be seen to include a tonguelike projection 33a that is received into the recess 52 in the motor housing 51. (Also see FIG. 3 as discussed earlier with regard to recess 52). The engagement of the tongue-like projection 33a (also see FIG. 6) and the recess 52 in the motor housing 51 precludes upward movement of the bin 30 by components of the forces applied to the lever arms 60, 65 as they are driven by the rotating cam discs 54, 55. To preclude the bin 30 from being forced outwardly from the freezer compartment by the action of the cams 54, 55, the retaining lip 27 is provided on sheld 26 as discussed earlier with regard to FIGS. 3 and 4. Thus, it can be seen that when the bin 30 is positioned within the freezer compartment, it is precluded from undesirable movement by the forces applied by the cam 54, 55. However, the bin is still easily removable by the user, who simply lifts the front end of the bin to clear the lip 27 as discussed earlier, and then slides the tonguelike projection 33a out of the recess 52 to easily remove the bin 30 as an integral unit from the refrigerator compartment, the bin 30 disengaging from the fixed drive means 50.

With reference to FIG. 9, the rams 40, 42 are held in spaced relation by a first bearinglike button tab 48 integrally formed as a portion of ram 40 and by a second bearing like button tab 49 integrally provided as a portion of ram 42. The distal ends of the buttons 48, 49 serve as bearing services that slide along the respective side of the rams 40, 42 to preclude excessive friction that would unnecessarily load the motor contained within housing 51. It can also be seen that opposed flange portions 31b of the floor 31 extend over front portions of the ram ends 41, 43 to help retain the rams in position within the central trough area of the floor 31.

Preferably, the ram members 40, 42 and major portions of the bin 30 are formed of suitable plastic material. The belt 70 is formed of a nonelastomeric material such as woven nylon cloth. The cam discs 54, 55 can also be formed of plastic material.

The ice dispenser mechanism constituted by the bin 30 and the drive means 50, with their associated elements, has been found to be very low in cost relative to prior art devices. Further, such ice dispenser mechanism has been found to operate in a highly reliable manner, the potential for ice jamming of the dispenser mechanism being eliminated due to the double agitating action of the twin fins 44, 45 associated with the rams 40, 42, and the resilient lever arms 60, 65 which allow the build up force on the ice rams for breaking any ice jams.

Although the preferred embodiment of this invention has been shown and described, it should be understood that various modifications and rearrangements of the parts may be resorted to without departing from the scope of the invention as disclosed and claimed herein.

What is claimed is:

1. An ice dispensing mechanism comprising:
a bin for storing ice pieces, the bin having a floor, a front wall, a rear wall, and a pair of opposed sidewalls, the bin including at its front end an aperture through which the ice pieces are expelled from the interior of the bin;
a pair of elongated, side-by-side ice rams mounted in the bin for pushing the ice pieces through the aperture, the ice rams reciprocating along parallel lines, one of the ice rams moving linearly toward the front of the bin as the other moves linearly toward the rear thereof; and
drive means for moving the ice rams relative to the bin and to each other, the drive means including a drive mechanism for alternately moving the rams toward the front of the bin and a separate return mechanism interconnecting said ice rams and operated by the front moving ram to drive the other ram toward the rear of the bin for alternately moving the rams toward the rear of the bin.

2. An ice dispensing mechanism comprising:
a bin for storing ice pieces, the bin having a floor, a front wall, a rear wall, and a pair of opposed sidewalls, the bin including at its front end an aperture through which the ice pieces are expelled from the interior of the bin;
a pair of elongated, side-by-side ice rams mounted in the bin for pushing the ice pieces through the aperture, the ice rams reciprocating along parallel lines, one of the ice rams moving linearly toward the front of the bin as the other moves linearly toward the rear thereof; and
drive means for moving the ice rams relative to the bin and to each other;
the drive means including a drive mechanism for alternately moving the rams toward the front of the bin and a return mechanism for alternately moving the rams toward the rear of the bin;
the drive mechanism including a pair of elongated lever arms having fixed ends pivotally mounted in position relative to the bin, and movable ends pivotally connected to the ice rams, the drive mechanism further including lever arm drive means engaging intermediate portions of said arms, said lever arm drive means alternately driving said lever arms wherein their moving ends are alternately driven toward the front of the bin to cause forward movement of the rams.

3. An ice dispensing mechanism comprising:
a bin for storing ice pieces, the bin having a floor, a front wall, a rear wall, and a pair of opposed sidewalls, the bin including at its front end an aperture through which the ice pieces are expelled from the interior of the bin;
a pair of elongated, side-by-side ice rams mounted in the bin for pushing the ice pieces through the aperture, the ice rams being slidably supported by the floor of the bin, the ice rams having forward ends located at the front end of the bin and rearward ends extending along parallel lines, one of the ice rams moving linearly toward the front of the bin as the other moves linearly toward the rear thereof;
a drive mechanism engageable with the rearward ends of the ice rams for moving the ice rams toward the front end of the bin to expel ice pieces from the bin via the aperture; and
a separate return mechanism interconnecting said ice rams and operated by the front moving ram to drive the other ram toward the rear of the bin for alternately moving the rams to the rear of the bin.

4. An ice dispensing mechanism comprising:
a bin for storing ice pieces, the bin having a floor, a front wall, a rear wall, and a pair of opposed sidewalls, the bin including at its front end an aperture through which the ice pieces are expelled from the interior of the bin;
a pair of elongated, side-by-side ice rams mounted in the bin for pushing the ice pieces through the aperture, the ice rams being slidably supported by the floor of the bin, the ice rams having forward ends located at the front end of the bin and rearward ends extending along parallel lines, one of the ice rams moving linearly toward the front of the bin as the other moves linearly toward the rear thereof;
a drive mechanism engageable with the rearward ends of the ice rams for moving the ice rams toward the front end of the bin to expel ice pieces from the bin via the aperture; and
a return mechanism for alternately moving the rams to the rear of the bin;
the drive mechanism including a pair of side-by-side cam discs eccentrically mounted in opposed relation on a motor driven shaft, and a pair of generally vertically extending, elongated, side-by-side lever arms, the upper ends of the lever arms being pivotally mounted to an upper portion of the rear wall of the bin, the lower ends of the lever arms being pivotally mounted to the rearward ends of the rams, intermediate portions of the lever arms being engageable with the cam discs wherein, upon rotation of the motor driven shaft, the lever arms act as cam followers, the cam discs applying a force to one and then the other of the lever arms which in turn drive their associated ice rams toward the front of the bin.

5. An ice dispensing mechanism according to claim 4, wherein said lever arms are resilient to permit limited rotation of the cam discs without corresponding movement of said ice rams toward the front of the bin, said limited rotation causing an increasing force to be applied to said ice rams to dislodge any ice pieces blocking forward movement of the ice rams.

6. An ice dispensing mechanism according to claim 4, wherein the motor driven shaft lies along the axis of rotation of the cam discs, said axis of rotation being perpendicular to said parallel lines along which the reciprocating ice rams move.

7. An ice dispensing mechanism according to claim 4, wherein the bin, the ice rams, the return mechanism, and the lever arms constitute a movable unit separable from the cam discs located at a fixed location.

8. An ice dispensing mechanism comprising:
a bin for storing ice pieces, the bin having a floor, a front wall, a rear wall, and a pair of opposed sidewalls, the bin including at its front end an aperture through which the ice pieces are expelled from the interior of the bin;

a pair of elongated, side-by-side ice rams mounted in the bin for pushing the ice pieces through the aperture, the ice rams being slidably supported by the floor of the bin, the ice rams having forward ends located at the front end of the bin and rearward ends extending along parallel lines, one of the ice rams moving linearly toward the front of the bin as the other moves linearly toward the rear thereof;

a drive mechanism engageable with the rearward ends of the ice rams for moving the ice rams toward the front end of the bin to expel ice pieces from the bin via the aperture; and a return mechanism for alternately moving the rams to the rear of the bin, the return mechanism for alternately moving the rams to the rear of the bin including a pulley rotatably mounted on the floor of the bin at the rearward end thereof, and a flexible belt having one end fixed to one of the ice rams and another end fixed to the other of the ice rams, the intermediate portion of the belt being looped over the pulley such that movement of the said one end of the belt toward the forward end of the bin causes the other said end of the belt to move toward the rearward end of the bin, the said other ice ram to which the said other end of the belt is fixed being pulled by the belt toward the rear of the bin.

9. An ice dispenser mechanism according to claim 8, wherein the flexible belt is formed of nonelastomeric material.

10. An ice dispenser mechanism according to claim 8, wherein the pulley axis of rotation is located between the rearward ends of the ice rams.

11. An ice dispensing mechanism according to claim 8, wherein the axis of rotation of the pulley is perpendicular to said parallel lines along which said ice rams move.

* * * * *